United States Patent [19]

Sheinbaum

[11] Patent Number: 4,512,155
[45] Date of Patent: * Apr. 23, 1985

[54] FLOWING GEOTHERMAL WELLS AND HEAT RECOVERY SYSTEMS

[76] Inventor: Itzhak Sheinbaum, 136 Walnut Ave., Monrovia, Calif. 91016

[*] Notice: The portion of the term of this patent subsequent to Dec. 21, 1999 has been disclaimed.

[21] Appl. No.: 451,884

[22] Filed: Dec. 21, 1982

Related U.S. Application Data

[62] Division of Ser. No. 99,674, Dec. 3, 1979, Pat. No. 4,364,232.

[51] Int. Cl.³ ............................ F03G 7/00; B63H 3/00
[52] U.S. Cl. .................................... 60/641.2; 417/109; 417/115
[58] Field of Search ................. 60/641.2, 641.3, 641.4, 60/641.5; 166/319, 320, 372, 373; 417/109, 110, 115, 117

[56] References Cited

U.S. PATENT DOCUMENTS

| | | | |
|---|---|---|---|
| 2,219,736 | 10/1940 | Bryant | 417/117 |
| 2,644,404 | 7/1953 | Bobo | 417/109 |
| 4,079,590 | 3/1978 | Sheinbaum | 60/641.3 |
| 4,364,232 | 12/1982 | Sheinbaum | 60/641.3 |

Primary Examiner—Allen M. Ostrager
Attorney, Agent, or Firm—David O'Reilly

[57] ABSTRACT

An apparatus and method for stimulating a flow from a geothermal well. A primary or stimulating fluid flows into the space between the inner and outer casings of the well. The primary fluid enters the inner casing through a series of valves at various elevations along the geothermal well casings. In one of the preferred embodiments the valves are responsive to the velocity of the primary fluid at the face of the valve to control the rate of fluid flow into the inner casing.

12 Claims, 9 Drawing Figures

FLOWING GEOTHERMAL WELLS AND HEAT RECOVERY SYSTEMS

This application is a division of application Ser. No. 099,674, filed 12/3/79 now U.S. Pat. No. 4,364,232.

BACKGROUND OF THE INVENTION

1. Field of the Invention

This invention relates to the extraction of geothermal heat energy from the earth and its utilization of the earth's surface. More particularly, this invention is a part of the technical aspects of stimulating the flow of geothermal wells for the recovery of heat carried therein and the conversion of this heat to electrical energy.

It is known that the interior of the earth is a molten mass of rock and is very hot. Water in contact with the hot interior of the earth is termed geothermal fluid. This geothermal fluid contains heat energy that may advantageously and effectively be used as a source of energy for the generation of power or in other heat recovery schemes. The geothermal fluid may be steam released from volcanic areas or hot water which is present in volcanic and in deep alluvial deposits that are porous enough to permit percolation of the water to the deep hot zones. This water may have a temperature as high as 700° F. at a depth of 5,000 feet.

To lift the water from the depth of the geothermal well to the well head where the heat therein can be utilized, a primary fluid is injected into the well under the surface of the water therein and with the action of the vaporized primary fluid, the geothermal water is lifted to the well head. Regulating the flow of the primary fluid into the well and starting up the well flow, continuously producing geothermal heat, converting this heat to electrical power and minimizing precipitation of solids in the well casing and other aspects of geothermal heat production are discussed herein.

2. Description of Prior Art

In some areas, the heat energy within the earth is carried to the surface by steam. This steam may be used directly in turbines to drive electrical generators.

The fluid from a geothermal well may flow naturally to the surface or may have to be pumped to the surface. Where pumping is required, it is typically accomplished by locating the pump at a selected level below the surface of the earth. When the pump is located in the well, a long drive shaft is generally required between the pump and the drive motor. Other geothermal well pumping devices have been proposed, including the electrically-driven pump where the motor and the pump are submersed in the well.

Many self-flowing water-dominated geothermal wells do not spontaneously flow without some startup stimulation. In the past, well startup stimulation was accomplished mainly by one of the following three methods:

a. By pumping fresh water down the well;
b. By inserting a tube down the well and pumping air or inert gases down the tube;
c. By inserting a tube down the well and pumping liquefied gases, such as liquid nitrogen or carbon dioxide down the tube.

In each case, the principle of the well startup is the same, namely a reduction in the density of the well fluid present in the well casing to cause disequilibrium in the well hydraulic system and thus commence the flow. Once started, the self-flowing well will continue to flow without any additional stimulation.

In an analagous system, the oil industry lifts much of its crude oil from the depth of the well by means of gas lifting. In artificial gas lifting, compressed natural gas is introduced down the well through valves that control the flow and the quantity of gas introduced. The natural gas thereafter lifts the oil up the casing and to the surface where the gas is disengaged from the oil and recycled back to produce additional oil. This system of oil lift has been in operation for many years.

There are a number of processing systems devised for the conversion of geothermal heat into electrical power. Some of them utilize an organic liquid as the working fluid and others utilize the geothermal steam itself or the combined geothermal steam and brine to produce electrical power. Each specific system may be advantageous under some set of circumstances with the proper type of geothermal resource. The power production processing systems mentioned above rely either on geothermal heat production from self-flowing geothermal wells or on mechanical lifting of geothermal brine to the well head.

The building up of scale in the geothermal well casing has been known for many years. The causes of the scale buildup and the methods of preventing scale buildup are well understood. One proposed system of preventing scale buildup in the well casing is to mechanically lift the geothermal brine and thus eliminate steam flashing in the well casing. To date, the art of mechanically pumping geothermal wells has not been reduced to practice. The physical conditions inside a geothermal well casing are hostile to the delicate moving or rotating machinery. The pressure of non-condensible gases, together with the geothermal liquid, makes conventional pumping of geothermal liquids more difficult.

SUMMARY OF THE INVENTION

To overcome the disadvantage of deep well pumps and otherwise increase the ability to remove heat energy from the earth, in the process of the present invention, a primary fluid is injected into a geothermal well in accordance with this invention through regulating valves to contact the heat energy within the earth and to act as a carrier of that heat to a heat recovery system at the well head. The primary fluid may have a boiling point below the temperature of the geothermal fluid at the level of injection, or it may be steam. The injection condition may be below or above the critical temperature and/or the critical pressure of the primary fluid. The injection of the primary fluid is regulated by control valves in a plurality of locations and in a plurality of elevations along the well casing. Some control valves may operate only during startup where liquid or vaporized primary fluids are introduced into the well casing through the control valve system to warm up the geothermal fluid and lift it up to the well head to initiate the circulation in the geothermal well. Other control valves along the well casing are designed for intermediate operation and full production operation. These types of control valves may differ from the startup control valves and may operate with other types of mechanisms.

Startup of self-flowing wells, in accordance with this invention, can be accomplished by adding heat to the well casing in the form of hot steam or other hot fluid. By heating up the well fluid and at the same time diluting the saline solution of the well fluid, the density of the fluid in the casing is reduced and thus the height of the fluid in the casing is increased. In the case where steam is directly added to the well fluid, the well fluid may start boiling and initiate the self-flowing requirements. Once a well starts producing, it warms up, and self-flashing can be perpetuated without the addition of steam to the system.

The geothermal well flowing and startup principles described herein, in accordance with this invention, include the introduction of heat to initiate the startup of geothermal wells. A primary fluid, in accordance with this invention, acts as a primer to stimulate the flow of the hot fluid from a geothermal well. For well stimulation, control valves are used to control the injection fluid flow and direct it to various elevations and locations within the well casing. The primary fluid, after it is injected into the geothermal water, mixes with the hot fluid in the geothermal well and reduces the density of the column of the well fluid in the well casing. The reduced density in the well casing causes disequilibrium that forces the entire well fluid to the surface. The well stimulation, as described herein, may also be used to clean up well deposits such as sand and other solids from the well.

The geothermal well includes two or more concentric tubes used for well casing, where the outer tube is the permanent well casing and the inner tube is inserted into the well and contains therein all the necessary valves and appurtenances to regulate the flow of the primary fluid. In addition, the well stimulation system may contain pumps, heaters and controls as necessary for the startup and the operation of the stimulated well, the continuous operation of the well and its shutdown.

The geothermal heat produced in accordance with this invention can be used in a variety of applications. It can be used to heat up hothouses to accelerate vegetation growth, it can be used in heating up buildings, swimming pools or industrial processes, or it can be used for the production of electrical power. FIGS. 2, 3 and 4 illustrate useful cycles by which the geothermal heat from the well containing primary fluid can be converted into electrical power.

Additional benefits from the well stimulation system in accordance with this invention include the suppression of undesirable well deposits called scale that tend to plug up self-flowing geothermal wells.

In the depths of the earth, the geothermal brine is in full equilibrium condition with its surrounding minerals. Cooling of the geothermal brine or flashing of steam and/or other gases may precipitate some of the minerals dissolved in it. Lowering the pressure of the geothermal brine may result in flashing of steam, $CO_2$, $NH_3$, $H_2S$, and other dissolved noncondensibles. Steam flashing will reduce the temperature of the brine which will, in turn, cause precipitation, while flashing of noncondensibles from the brine may cause carbonate precipitate and/or shift in pH of the brine to cause precipitation of other materials.

It is known that geothermal brine contains various amounts of non-ionic soluble materials such as silicas, iron oxides, calcium carbonates and others. The hot brine leaches these components from the deep alluvial rocks and carries these compounds, together with ionized salts, in a solution form. When heat and/or vapor is extracted from this brine, the brine may reach a saturation point with respect to any of the minerals dissolved therein and as cooling proceeds, these minerals may precipitate out of the brine. In a similar way, altering the partial pressure of carbon dioxide and other gases in the brine may change the pH of the brine and can cause precipitation of calcium carbonate, silicates and other minerals. In self-flowing wells containing brines saturated with dissolved minerals, the brines may cool from 55° F. at the bottom hole to about 350° F. at the well head. At the same time, the pressure changes from 2,000 psi or so to about 150 psi. This release in pressure causes the formation of internal steam which concentrates the solids in the liquid phase of the geothermal fluid and cools it. Thus, saturated minerals present in the brine will precipitate and deposit themselves on the well casing. Carbonates and silicates will also precipitate out when carbon dioxide is flashed from the brine. In accordance with this invention, the injection of a primary fluid into the brine at predetermined locations down the casing will lift the brine out of the well with only a minimal amount of geothermal steam formed. By selecting the proper injection fluid, the proper location of the injection, injection temperature and pressure, and the proper flow of injection fluid into the well, the conditions at the well head can be controlled to hold higher back pressures and production temperatures at the well head with stimulated throughput capacity.

Further, it is known that the efficiency of utilizing the geothermal brine, whether for the production of electrical power or for any other purpose, is directly related to the temperature of the brine utilized in the processing unit. By using this geothermal fluid lifting technology, the well can be stimulated to flow with reduced internal flashing at high operating pressures to produce high temperature brines. Higher production temperature may increase the efficiency of the above ground heat conversion processes.

Efficient utilization of the geothermal heat for the production of power is a part of this invention. Combining the use of primary fluid with above ground conversion processes to produce power from geothermal heat can be accomplished in many ways. Three preferred ways are described herein. FIG. 2 illustrates a power conversion cycle where both the primary, or injection fluid and the working fluids used for the production of power in the cycle are identical. Primary fluid is preheated by direct contact with geothermal brine and thereafter reinjected into the geothermal well for the stimulation of the well. Vaporized primary fluid containing geothermal steam exits the well head together with geothermal brine. The gaseous phase and the liquid phase are separated in a separator. The gaseous phase is expanded through an expander to produce electrical power, the expanded gases are condensed and pumped back to the direct contact heat exchanger, while the liquid phase is used as indicated to preheat the primary fluid before reinjection. FIG. 3 illustrates another type of power conversion cycle utilizing stimulated geothermal heat. Vaporized primary fluid, including geothermal steam and geothermal brine, leave the well head and enter a separator. In the separator, the liquid is separated from the gaseous phase, the gaseous phase is piped to an expander for the production of power. The liquid phase from the separator passes through a pressure reducing control valve and enters the secondary separator where additional geothermal steam and dissolved primary fluids are removed. The gaseous phase thus formed enters the above-mentioned turbine or a second independent turbine for further expansion into power. Liquid from the secondary separator is utilized for preheating primary fluid before reinjection. The combined vapors from the separator and the secondary separator after expanding in the expander, enter a condenser, condense and enter a phase separation in an accumulator wherein the primary fluid is separated from water condensate by gravitational phase separation. Thereafter, the primary fluid is pumped through the above-mentioned exchanger with the exhausted brine, and the preheated primary fluid is injected into the well for the production of additional geothermal heat. FIG. 4 illustrates a power production cycle wherein the primary fluid is steam. In this cycle, geothermal steam containing injected steam, together with geothermal brine, exit the geothermal well head and enter a separator. In the separator, the steam is separated from the geothermal brine and piped into an expander. The geothermal brine is allowed to flash across a pressure reducing control valve before entering the secondary separator. Additional steam, is produced in the secondary separator and this lower pressure steam is fed to the expander or to a separate paralleling expander. The liquid from the secondary separator is used to preheat condensate before the condensate is fed into a steam boiler. After expansion of the steam in the expander, the total exhausted steam is condensed and a portion of the condensate is utilized to generate additional primary fluid. Condensate is preheated by the above-mentioned geothermal brine, it enters into a boiler where the condensate is turned into steam, and the steam thus formed is injected into the well for the production of additional geothermal heat. In the cycle described in FIG. 4, an external heat source is required to vaporize the primer fluid.

FIGS. 5 and 6 illustrate the use of vaporized primary fluid to be used for the startup of geothermal wells and/or in continuous operation of geothermal heat production. For both of the schemes shown in FIGS. 5 and 6, external heat is required to warm up the geothermal fluid inside the well casing for the initiation of the geothermal flow and/or the stimulation of the geothermal flow for the production of heat.

FIGS. 7, 8 and 9 illustrate control valve devices to control the flow of primary fluid into the well head as required for the stimulation of heat from the geothermal resource.

DESCRIPTION OF PREFERRED EMBODIMENTS

Heat from the earth may be brought to the earth's surface by a hot fluid such as water from a geothermal well. Water may be relatively pure as found in the Mammoth or East Mesa areas of California, or relatively high in dissolved solids, as found in other parts of the Imperial Valley, California. In either case, the extraction of this water carrying heat from below the earth's surface is advantageous as the hot fluid may be used for many purposes. One particular use is the production of electrical power from steam that may be generated by flashing this hot water into steam and brine or by vaporizing a secondary fluid that can be advantageously expanded in a gas expander to produce mechanical power that can be converted into electrical energy. It has been found that in many areas, the natural flow from geothermal wells is insufficient to warrant the installation of equipment to recover the heat energy contained therein. These wells may be caused to have increased flow in accordance with this invention by injecting a primary fluid at selected levels into the well. A simplified example of the well stimulation principle and calculated pressures is presented.

Figure 1:
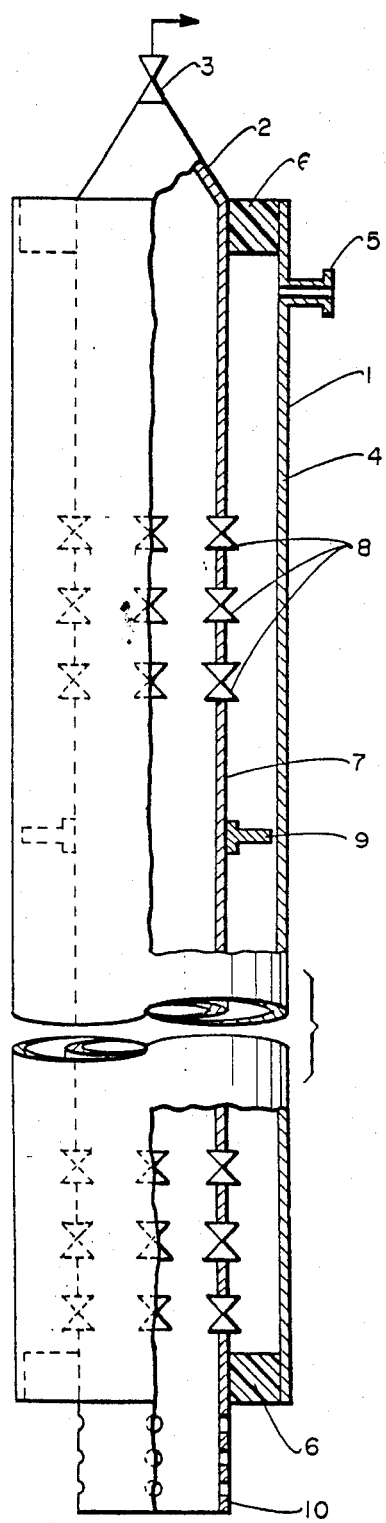
FIG. 1 depicts the internal components of the geothermal well required for well startup and operation with the injection of a primary fluid or steam.

A geothermal well is diagrammatically shown in FIG. 1 of the drawing for the purposes of illustration. It will be assumed that the well has a depth of 5,000 feet and the water level under the static (no flow) conditions stands at 100 feet below the surface when the well is kept at 120 psig casing pressure at the well head. The well 1 is capped with a cover 2 and has a valved outlet 3 for flow from the well.

It is further assumed that the well is located in an area where salts and other minerals are dissolved in the water and that the geothermal fluid has an average density of 64.4 pounds per cubic foot at the operating temperature. Thus, there is a static pressure at the bottom of the well of approximately 2,311 psig. The bottom hole temperature of geothermal wells can be in excess of 700° F. For the purposes of this disclosure, it is assumed that the bottom hole temperature is 350° F. This is a typical temperature for geothermal wells in California, which typically has the above bottom hole pressure. The well, under atmospheric pressure and after start of stimulation is found to flow at a rate of 50 gallons per minute (GPM). The difference in the bottom hole pressure for the 50 GPM flow is 75 psi. The static pressure outside the casing at the bottom of the well is 2,311 psig, while the bottom hole pressure with the top open is 2,236 psig. A driving force from the production zone to the bottom hole of 75 psi produces a flow of 50 GPM. If the flow is to be increased to 400 GPM, the pressure difference between the production zone and the bottom hole must also be increased by approximately eight times. Under these conditions, the pressure difference would be 600 psig so that the bottom hole pressure must be 1,711 psi.

To reduce the bottom hole pressure to the desired pressure of 1,711 psi, it has been found that a primary fluid having a boiling point below the temperature at the level of injection at the operating pressure existing at that level which can be above or below the fluid critical condition, may be injected at an appropriate level to cause a reduction in the bottom hole pressure. For example, if an injected primary fluid such as isopentane is injected at a depth of 2,000 feet and at a temperature of 200° F., when the injected fluid is vaporized and well mixed with the well fluid, the average density of the well fluid is reduced to about 18.0 lb/CF above the injection point. The bottom hole pressure is reduced to approximately 1,711 psi, and about 400 GPM of geothermal fluid will flow from the well. Under the illustrative conditions, about 84 GPM of isopentane at 200° F. is injected at the 2,000 foot level to cause the 400 GPM of geothermal fluid to flow from the well. The primary fluid upon contacting the geothermal fluid at the pumping depth or injection level is vaporized and is combined with the hot geothermal fluid in flowing from the well. The above example is simplified and presented herein for illustrating the principle of the flow stimulation only.

Other hydrocarbons or derivatives such as isobutane and any of the freons may be used as the primary fluid. In accordance with this invention, steam may also be used as a primary fluid. The primary fluid may be injected into the geothermal well either in its liquid form as shown in the example above, or in its gaseous state. The selection of the primary fluid and the choice between using the primary fluid in its gaseous state or its liquid state is governed by a variety of factors. One such factor is the possibility of solid deposit in the well casing. When steam is used to stimulate and lift the geothermal water, or when gaseous hydrocarbon is used to stimulate and lift the geothermal waters from the depths of the earth, only a minimum amount of heat is extracted from the geothermal fluid and thus the cooling effect of the geothermal fluid in the well casing is minimized.

When liquid hydrocarbons are used as primary fluids, the heat required to vaporize the hydrocarbon, whether above or below its critical condition, is supplied by the geothermal fluid. The required heat to vaporize the hydrocarbon primary fluid when under its critical conditions or to heat the hydrocarbon fluid when operating above its critical condition is much lower than the required heat for the vaporization of steam in the naturally self-flowing wells per unit of weight of vapor produced. Consequently, whether liquid hydrocarbons, gaseous hydrocarbons, or steam is used as a primary fluid, the temperature degradation of the geothermal fluid in the well casing is significantly less than the temperature degradation that occurs in self-flowing, self-stimulated geothermal wells. Therefore, in accordance with this invention, lower temperature degradation in the casing of the geothermal well means that the geothermal water at the earth's surface is available at a higher temperature, which, in turn, allows for a higher utilization efficiency of the geothermal water at the earth's surface. In addition, by minimizing the temperature degradation of the geothermal fluid in the well casing, the deposition of solids in the well casing can be minimized.

The primary fluid may be injected at numerous different levels in the well or it may be injected at a single level. Additionally, the primary fluid may be injected continuously or intermittently for surge flow.

FIG. 1 illustrates the internal components of a geothermal well as needed for the stimulation of the well with a primary fluid. Many other configurations, wherein the primary fluid is piped down the well and distributed into the geothermal fluid, are possible. The primary fluid can be introduced in the outer casing of the well or it may be pumped into the well through a pipe inserted into the well. In any event, many of the elements described in FIG. 1 can be rearranged and applied to other configurations. The geothermal well (1) is capped (2) and has an outlet valve (3) which may be a series of valves. Primary fluid, whether liquid or in a gaseous state, is introduced into an outer casing (4) through a nozzle (5). The outer casing is sealed with packers (6) to the inner casing (7). In the void between the outer casing and the inner casing, the primary fluid flows downward. The primary fluid enters the inner casing (7) through a series of valves at various elevations along the geothermal well casings. The inner casing (7) is centered inside the outer casing (4) with the centering elements (9) to prevent vibrations and to keep the void between the inner and outer casings open for the flow of the primary fluid. Primary fluid enters through valves (8), mixes with the geothermal fluid inside the inner casing (7) and stimulates the flow of the geothermal fluid up the well bore and to the earth's surface. Geothermal brine from the depths of the earth enters the geothermal well inner casing (7) through the perforated section of the casing (10) and proceeds upward with the aid of primary fluid to the earth's surface.

The hot geothermal fluid and vaporized primary fluid may be used for many purposes. The mixture may be used for heating buildings, such as is done in Iceland. Another particularly advantageous use is the generation of electricity by driving one or more generators from one or more power-extracting gas expansion devices (expanders). The vapors of the geothermal fluid and the primary fluid may be separated from the mixture in a flash chamber and used directly in an expander. Alternatively, the vapors may be employed in one or more heat exchangers to heat a heat transfer fluid or a working fluid, the vapors of which are passed through an expander.

One particularly efficient use of the steam and primary fluid mixture is the production of power with a direct contact cycle. Such a system is depicted by the process flow diagram of FIG. 2. The system includes a closed loop in which a working fluid is circulated. The closed loop includes a direct contact heat exchanger (11) (contractor), a power-extracting gas expansion device (12) (expander), a condenser (13), an accumulator (14) and pump (15) for working fluid circulation. The expander (12) drives a utilization means (16) which may advantageously be an electrical generator for the generation of electricity. The condenser (13) is cooled by a fluid which may advantageously be supplied from a cooling tower (17) operating at atmospheric conditions.

Geothermal liquid, together with vaporized primary fluid and steam, exit from the geothermal well and enter a separator (18) where the geothermal water is separated from the gaseous phase. The gaseous phase is expanded through an expander (12) which advantageously drives an electrical generator (16) to produce electricity. Thereafter, the expanded gaseous phase enters a condenser (12), the primary fluid and the steam condense, and the primary fluid is recycled through a circulation pump (15) to a direct contact heat exchanger (11). In the direct contact heat exchanger, the aqueous portion of the geothermal fluid, after expansion in turbine 24, enters at the top of a direct contact heat exchanger while the condensed primary fluid from the circulation pump enters at the bottom portion of the direct contact heat exchanger; the primary fluid, having a lower density, rises through the geothermal water and absorbs the heat from the water while the geothermal water proceeds downward in the direct contact heat exchanger continuously and countercurrently exchanging heat with the primary fluid. The water phase may be the continuous phase or the discontinuous phase in the direct contact heat exchanger. The heated primary fluid is then injected through the injection pump (14) into the bore hole down the geothermal well for additional stimulation of the geothermal fluid as described above. The cooled aqueous geothermal phase proceeds to the recovery unit (20) where the dissolved primary fluid and additional energy is recovered. The geothermal liquid is then reinjected back into the formation under the earth's surface.

The gaseous portion of the geothermal fluids that may contain gaseous primary fluid separated in the separator (18) is cleaned from entrained minerals in water droplets in the upper section of separator (18). The gaseous portion of the geothermal fluid and the gaseous portion of the primary fluid can be cleaned in many ways. They can be introduced tangentially into a vapor-liquid separator where centrifugal forces separate liquid droplets from the gaseous phase, thus removing entrained minerals that concentrate in the liquid phase, they can be removed as shown in FIG. 3 with the help of a demister or a demister which may be continuously wetted by condensate to wash the gaseous phase of the geothermal fluid as it passes through, or it can be cleaned on recirculation trays where good and continuous contact between condensate and the gas is maintained. The gaseous phase of the geothermal fluid expands in the upper section of the separator (18). Cleanup with the help of trays is indicated at 21 in FIG. 2. Condensate formed in the accumulator (14) is pumped through the condensate pump (22) to the top of the separator (18). The condensate is used in washing the gaseous portion of the geothermal fluid which may contain gaseous primary fluid before it enters the expander (12).

Figure 2:
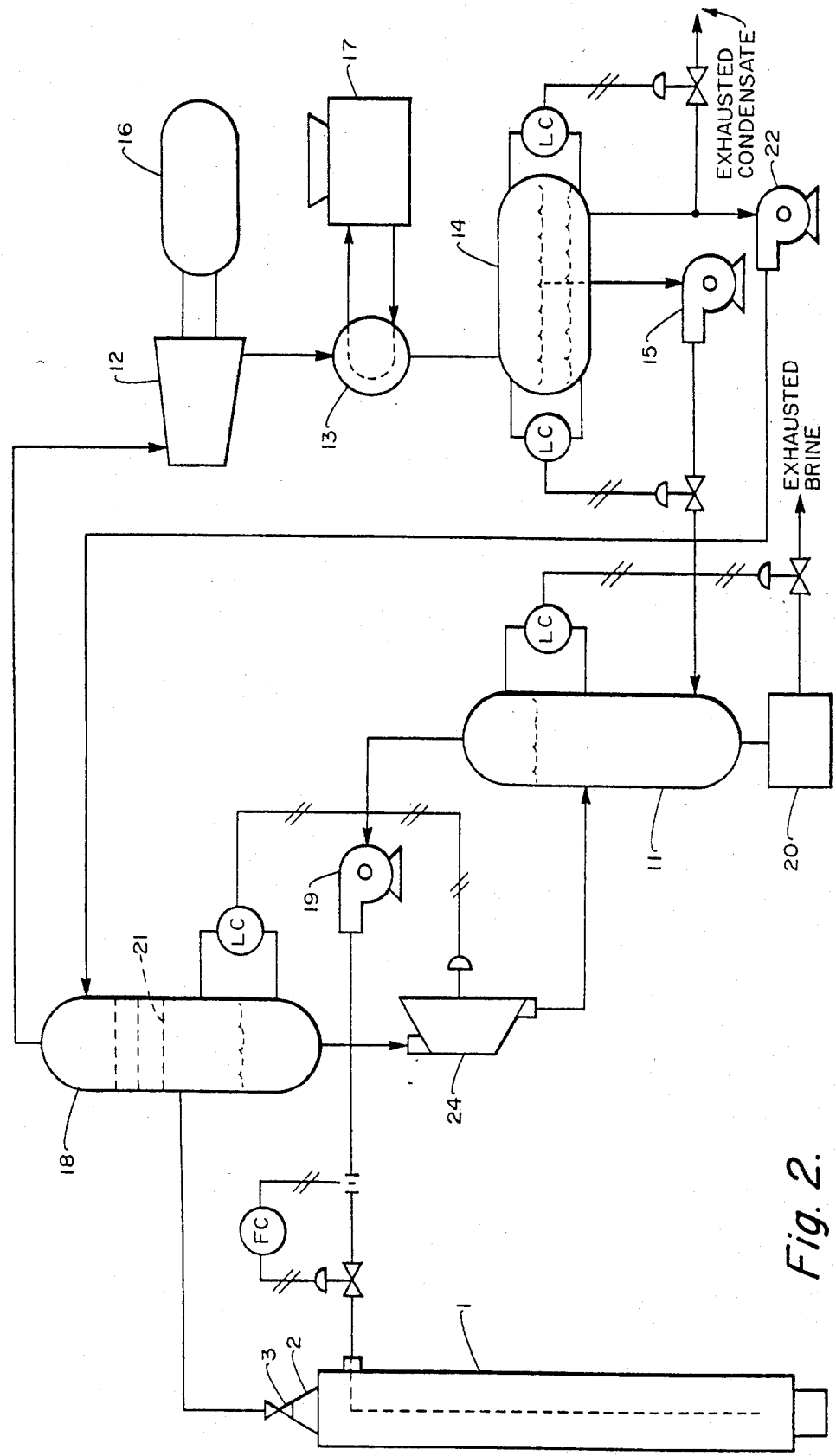
FIG. 2 is a flow diagram of a process for the production of electrical power from the geothermal heat. This process utilizes the primary fluid used to stimulate the geothermal well as a secondary fluid in the power production cycle. Primary fluid preheating is accomplished by extracting heat from the exhausted brine before the brine is reinjected.
Figure 3:
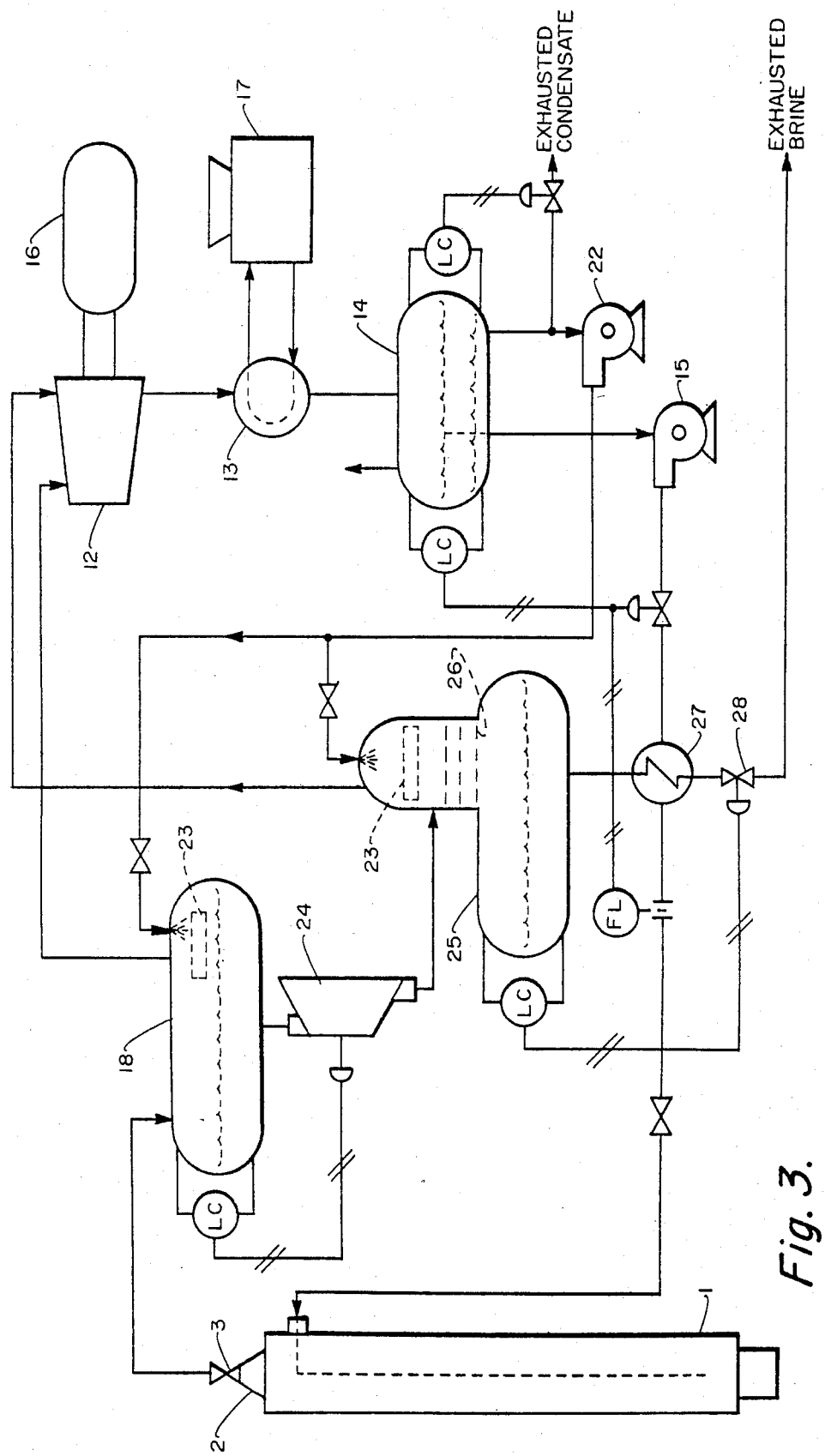
FIG. 3 is a process flow diagram illustrating a preferred well stimulation procedure and above-ground utilization cycle for the conversion of geothermal heat into electrical power. The above-ground utilization cycle shown is a two-stage flash where the primary injection fluid and the circulating working fluids are identical. The primary fluid-working fluid is nonaqueous.

FIG. 2 also shows a simplified control system for the power production cycle where the level of the liquids in the various elements of the above-ground cycle are automatically controlled and the flow of primary fluid is set to meet the requirements of the system. The injection of the primary fluid into the geothermal well is schematically shown as a pipe dipped into the geothermal well.

FIG. 3 illustrates a scheme for the production of power from geothermal heat by the direct flashing process. In this process, geothermal brine containing steam and primary fluid exit the geothermal well (1) through the control valve (3) and enter the separator (18). The separator in FIG. 3 is shown as a horizontal vessel. However, it can be a vertical vessel as shown in FIG. 2. The gaseous phase is separated in the separator (18), passes through a demister (23), where the demister is continuously wetted with condensate pumped by the condensate pump (22) from the accumulator (14). Other methods of cleaning up the geothermal vapors that may contain primary fluid vapors have been discussed in connection with FIG. 2. After the vapor is cleaned up from entrained water droplets containing minerals, the gaseous portion of the geothermal brine and the primary fluid vapor contained therein can be used for many purposes. One such purpose is the production of power where the gases are expanded in the expander (12) and power is generated in generator (16). The liquid portion of the geothermal fluid leaves the separator (18) through a liquid turbine expander (24) and enters the secondary separator (25). The secondary separator (25) may be equipped with a trayed section (26) to enhance the removal of dissolved primary fluid from the geothermal liquid. Additionally, the secondary separator may have a demister and a condensate wash section as described above. Vapor from the secondary separator, after scrubbing for the removal of water droplets and minerals, can enter the same turbine as vapor from the first separator or it may enter a secondary turbine equipped with a separate condenser and a separate accumulator. In any event, the gases from the secondary separator are expanded in the turbine to produce electrical power. The vapors from the first separator and the secondary separator after expansion are condensed together or in paralleling systems. The condensate flows into an accumulator/accumulators (24), the primary fluid is recovered by phase separation and reinjected with the reinjection pump (15) into the geothermal well (1) after exchanging some heat with the spent brine in exchanger 27 to recover as much of the geothermal energy as is feasible. Additionally, exchanger (27) can be used to heat and vaporize the primary fluid with steam for the purpose of geothermal well start-up. Geothermal well hot-startup is a part of this invention and is discussed elsewhere. Exhausted brine, after exchanging heat in exchanger (27) with the primary fluid, passes through the control valve (28) (or another liquid turbine) and is disposed of either into surface ponds or reinjected directly into the earth. For illustration purposes, a two-stage flash system was described and illustrated in FIG. 3; however, such systems can be used wherein only a single stage flash is used and the secondary flash tank is eliminated or, similarly, a three-stage flash can be used to enhance the recovery of heat from the geothermal brine. Once the entire system, as shown in FIG. 3, is brought to a steady state, there may be no need for the injection pump (15); the primary fluid may be introduced into the geothermal well (1) by its own gravitational forces. This case may be especially useful when the primary fluid is injected into the well in a liquid phase. The controls shown in FIG. 3 are schematic only and intend to illustrate one possible method of automatically controlling the process as described.

Figure 4:
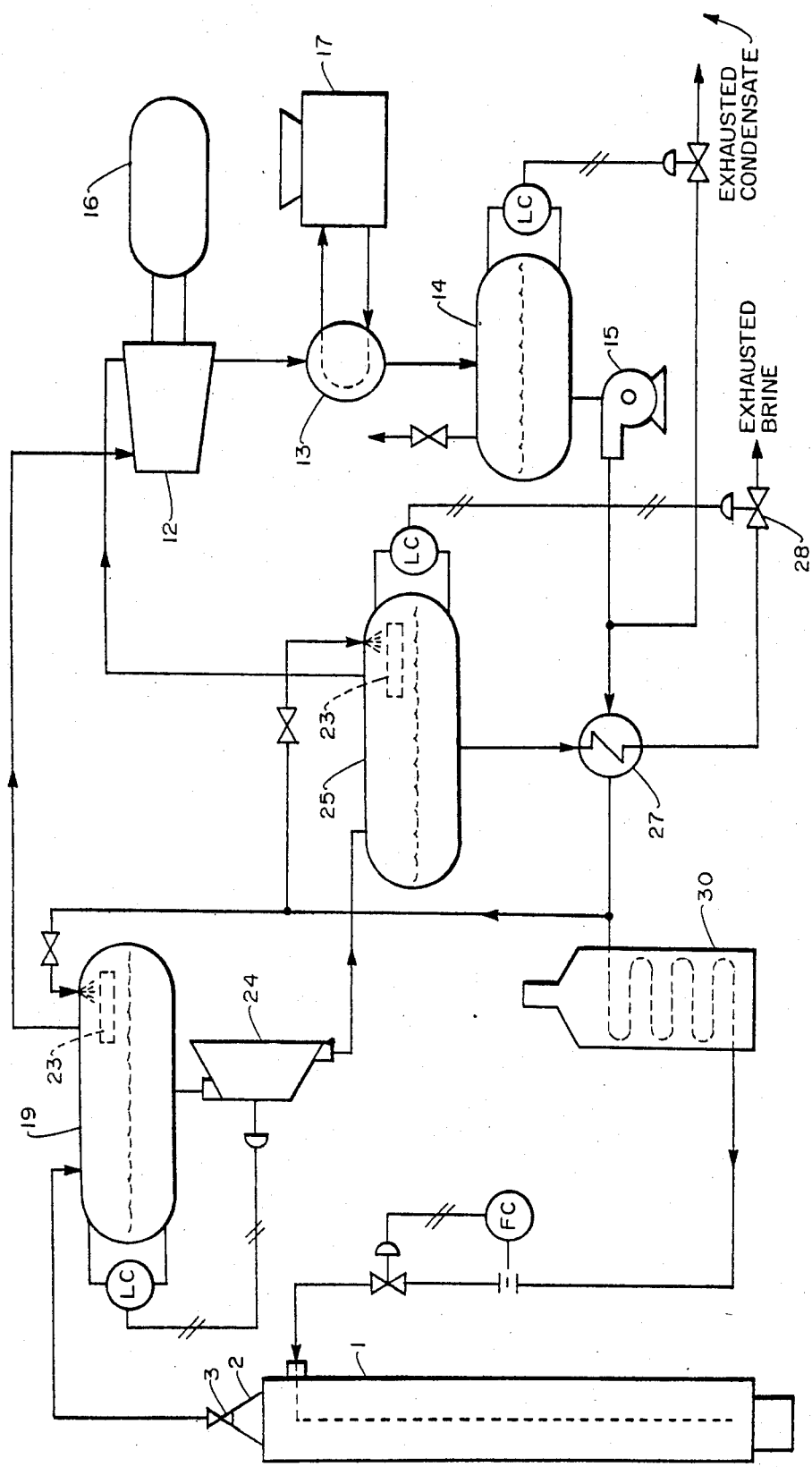
FIG. 4 is a process flow diagram illustrating a preferred cycle for the conversion of geothermal heat into electrical power. The process shown is a double-flash steam cycle where steam is used for the stimulation of the geothermal well.

FIG. 4 illustrates a well stimulation process and a power production process wherein the primary fluid is water. In this process, the geothermal well is stimulated to flow with the help of steam. Other vaporized primary fluids can be similarly used, but for the purpose of illustration, steam will be described herein. Steam is injected at a predetermined rate into the geothermal well to stimulate the flow of geothermal fluid from the well. The mechanism by which the steam stimulates the flow of geothermal fluid from the well is the same one discussed previously, namely, by lowering the density of the fluid in the geothermal well casing, the existing hydraulic and other forces which naturally occur in the system lift the geothermal fluid to the earth's surface. As the geothermal fluid exits the well, it is composed of two phases, the gaseous phase and the liquid phase. The geothermal heat thus brought up from the depths of the earth can be utilized in many heat utilization schemes. It can be used to heat residential buildings, it can be used in industrial applications where a large amount of low temperature is utilized, or it can be used for the production of power. Electrical power can be produced from geothermal heat in a variety of cycles. It can be produced in a rankine cycles where a working fluid is vaporized, expanded, condensed and recycled, it can be produced by the direct contact cycle as shown in FIG. 2, or it can be produced by the double flash system as described in FIG. 4.

Geothermal fluid containing dissolved solids, noncondensible gases in liquid and vapor phase exit the geothermal well (1) and enter the separator (18). In the separator, the gaseous phase is separated from the aqueous phase. The gaseous phase passes through a demister (23) which is continuously washed with condensate or it may pass through a variety of other scrubbers designed to reduce or eliminate entrained droplets containing dissolved minerals from the geothermal gaseous phase. Thereafter, the geothermal steam enters an expansion turbine (12) where the steam is expanded to produce electrical power by rotating generator (16). The liquid phase of the geothermal fluid passes through the turbine (28) into the secondary separator (25) where additional steam is formed. The secondary separator's steam passes through the demister (23) and enters the expander (12). The condensate from the entire system is condensed in condenser 13, either in a surface condenser or in a barometric condenser. The condensate is then pumped through an injection pump (15), through the heat exchanger (27), to preheat the condensate before entering the heater (30). Heater (30) is used as a boiler to boil the condensate into steam and the steam thus formed is injected back into the geothermal well to further stimulate the well. The exhausted brine and excess condensate are removed from the system and disposed of, either into surface ponds or reinjected back into the ground.

It is known that many geothermal brines contain large amounts of dissolved minerals and dissolved noncondensibles. In the earth's depths, geothermal brine maintains chemical equilibrium with minerals and gases present in the vicinity of the geothermal reservoir. As the water is brought to the earth's surface, many physical changes occur. The pressure under which the geothermal brine is produced from the well may change continuously from the bottom hole condition to the surface condition. This change may cause emission of noncondensibles and steam on the one hand and precipitation of minerals on the other. As the noncondensibles and steam leave the geothermal hot water, the pH of the brine may change, the concentration of minerals in the water may reach its saturation point, and precipitation of some of the minerals may occur. The precipitation causes fouling on heat exchange surfaces, plugging up of valves, pipe and fittings, and initiates corrosion of equipment. Another direct result of pressure changes is the emission of carbon dioxide, ammonia and hydrogen sulfide from the geothermal brine, which in turn changes the pH and composition of the brine to further cause disequilibrium, solid precipitation and accelerated corrosion. In accordance with this invention, by lifting the geothermal fluid from the well with the help of a primary fluid, the reduction in geothermal fluid temperature can be minimized, together with the prevention of steam flashing, reduction in the emission of noncondensibles and reduction in the precipitations of solids in the well casing. Reduction of noncondensible emission from the geothermal fluid is achieved by flowing the well with sufficient back pressure in the system to minimize noncondensible and steam emission. Reduction of solid precipitation in the well casing is achieved with the help of two distinct mechanisms which are a part of this invention. The formation of two phase flow (aqueous phase and gaseous phase) in the well casing is the mechanism by which geothermal fluid is lifted to the surface. As the geothermal fluid is lifted up the well casing in the natural flowing geothermal wells, additional flash steam is formed and thus the concentration of minerals in the aqueous phase increases and precipitation of excess minerals may occur. In accordance with this invention, primary fluid vapor is substituted for the self-flashing steam in the lift mechanism and therefore the concentration of the minerals in the aqueous geothermal phase does not change, thus eliminating precipitation in the casing due to concentration changes in the aqueous solution. The second scale reduction precipitation of geothermal brine is achieved by reducing the amount of heat removed from the brine in the process of lifting the brine up the geothermal well casing. While steam requires approximately 1,000 BTU per each pound of steam formed, typical primary fluids require between 100 to 200 BTU per pound of vapor formed, and thus less heat is removed from the brine up to the earth's surface. Because less heat is required, in accordance with this invention, as compared to the self-flowing mechanism, less temperature degradation is created and thus less solids will precipitate out of the brine in the well casing.

It is known that the efficiency of geothermal heat conversion processes is directly related to the temperature at which the geothermal fluid is produced. The higher the temperature, the higher the conversion efficiency. Typically for self-flowing geothermal wells, bottom hole temperature may be in the order of 500° F. to 600° F., while the available geothermal fluid at the well head may be only 350° F. This degradation of temperature significantly affects the efficiency in utilizing this geothermal heat. The temperature degradation is due directly to the steam flashing process which is the mechanism by which the geothermal fluid is produced and brought to the earth's surface. In accordance with this invention, the amount of heat required for lifting the fluid through the well casing to the earth's surface is less than the amount of heat required for flowing natural self-flowing wells. Thus, the anticipated well head temperatures can be higher than the anticipated well head temperature for self-flowing wells when this invention is practiced. Higher well head temperatures will enable the above ground conversion processes to be more efficient.

Another portion of the invention deals with the startup of geothermal wells in general and the startup of geothermal wells with primary fluid in particular. It is known that starting up the flow in geothermal wells is difficult even for those geothermal wells that are capable of self-flowing once the self-flow mechanism has been induced. A number of procedures have been established for initiating the flow of geothermal wells. These procedures are mentioned elsewhere. There are many difficulties associated with geothermal well startup. One of the persisting problems associated with geothermal well startup is the cold water layer present in the casing. This layer has a density equal to or higher than the density of the water outside the casing and thus prevents any natural lift of brine in the well casing. Various means of reducing the density of the fluid in the well casing have been proposed and have been practiced.

Figure 5:
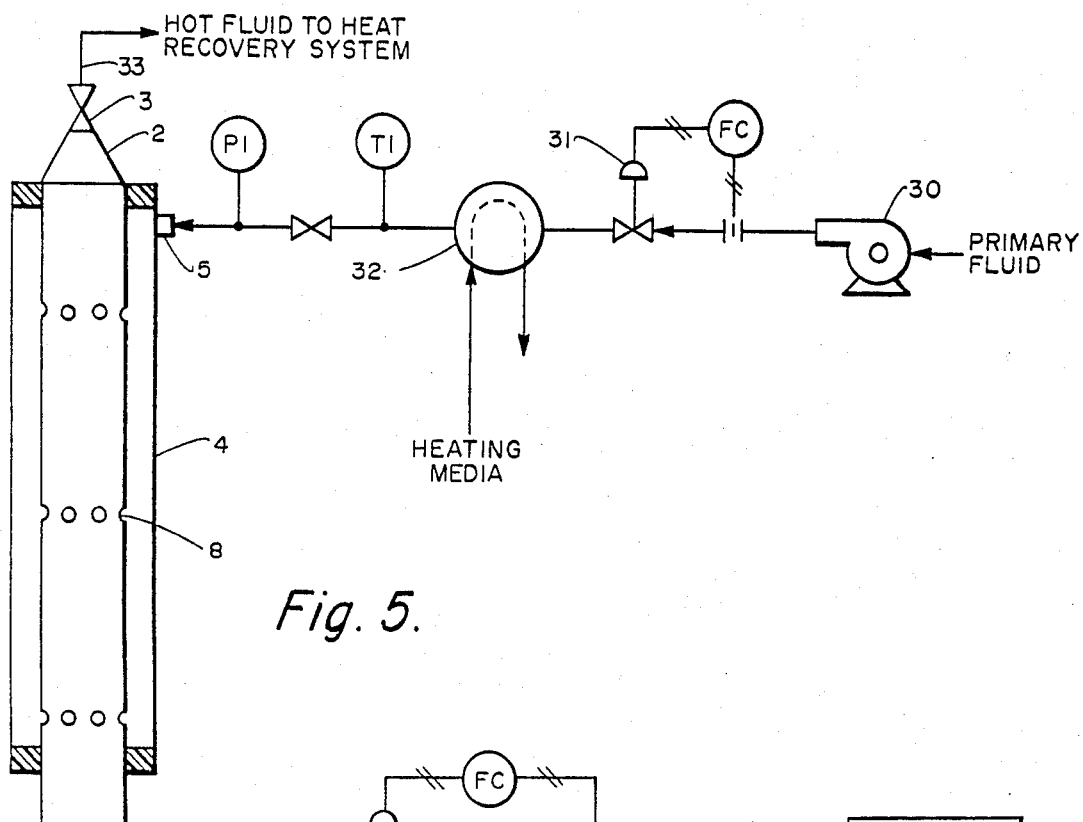
FIG. 5 is a process flow diagram depicting the hot startup system with a primary fluid.

In accordance with this invention, one method of starting up cold wells is the stimulation of the well with vaporized or heated primary fluid. The primary fluid used can be a variety of substances, such as hydrocarbons, hydrocarbon derivatives, freons or steam. One such system where the primary fluid is a hydrocarbon or hydrocarbon derivative is depicted in FIG. 5. The primary fluid recirculation pump (30) delivers primary fluid through a flow control station (31) into a heater/vaporizer (32). The hot fluid in a liquid or vapor form (above or below its critical conditions) enters the outer casing (4) of the geothermal well (1). The hot fluid thus introduced replaces any cold geothermal fluid or cold primary fluid in the outer casing (4) of the geothermal well (1). The hot fluid thus introduced exchanges heat with the geothermal brine inside the internal casing of the geothermal well (1) and heats up the geothermal fluid. When the temperature of either the primary fluid in the outer casing or the geothermal fluid in the inner casing reaches a preset limit, valves (8) located at a predetermined elevation start to open and allow for the direct injection of the primary fluid into the geothermal brine. The vaporized primary fluid acts as a carrier for the brine in the inner casing and lifts the brine toward the well head (2), through collection piping (33) to the heat recovery system. Once the system starts flowing, the geothermal heat will heat up the rest of the system. As the system heats up, additional valves may open up at other elevations down the well casing, and the injection of the primary fluid can be diverted to other locations down the casing of the geothermal well.

Figure 6:
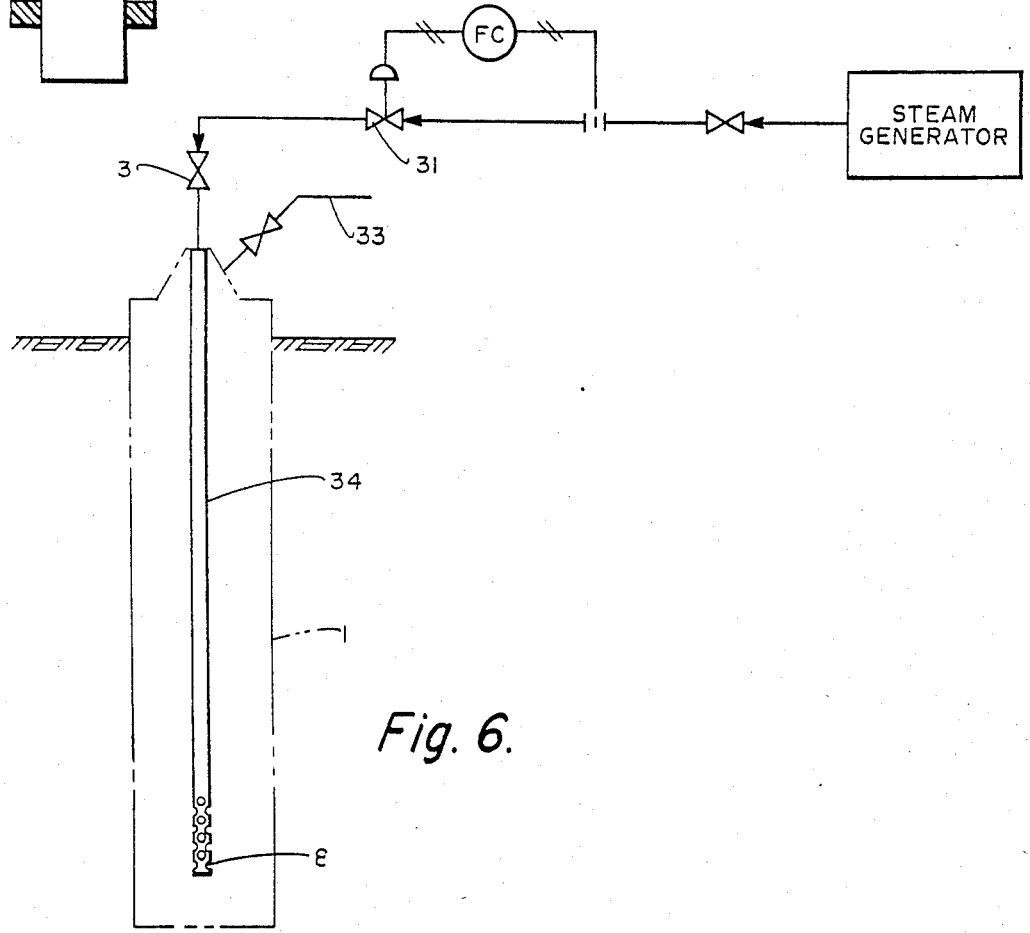
FIG. 6 depicts a process flow diagram wherein the geothermal well is stimulated with steam.

FIG. 6 depicts another system, where the startup of the geothermal well is conducted with the help of a primary fluid which, in this case, is steam. Other primary fluids, whether vaporized or in a liquid state above or below the critical temperature and pressure of the primary fluid can be used to start up the geothermal well and/or continuously stimulate geothermal wells by the same process. The geothermal well (1) has a long tube (34) inserted into it to a point below the static liquid level of the water in the well. The tube (34) may have a plurality of valves (8) at various elevations in the tube. Steam or other primary fluid is introduced through a flow control station (31) into the tube (34) and the entire flow is injected into the well casing (1) at a predetermined elevation. The heated primary fluid heats up the cold water layers inside the geothermal casing to a point where the temperature in the casing is sufficiently high to initiate the self-flowing of the well. The initiation of the self-flowing can be due to lowering the density of the fluid in the casing by either temperature effect alone or by the creation of primary fluid vapor or steam vapor. This startup procedure is complete when the well starts to either self-flow or stimulates itself with the help of a primary fluid as discussed elsewhere.

Figure 7:
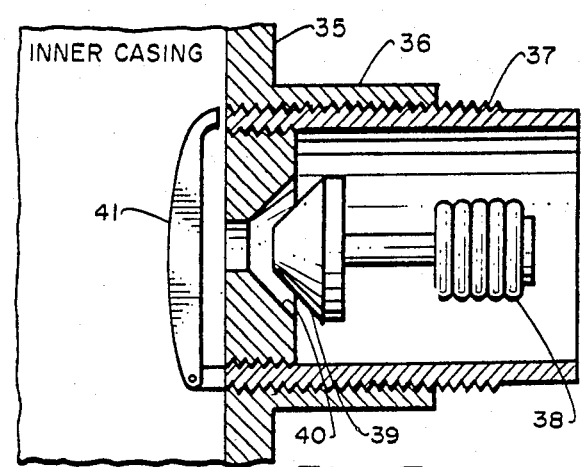
FIGS. 7, 8 and 9 illustrate various alternative designs for inlet valves required both in the startup of the geothermal well and the continuous flow of the wells.
Figure 8:
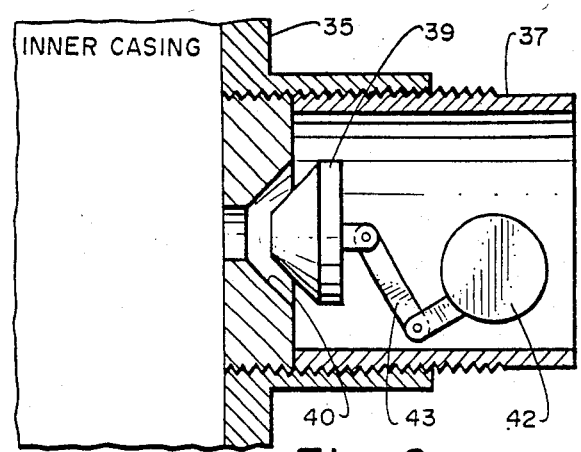
Figure 9:
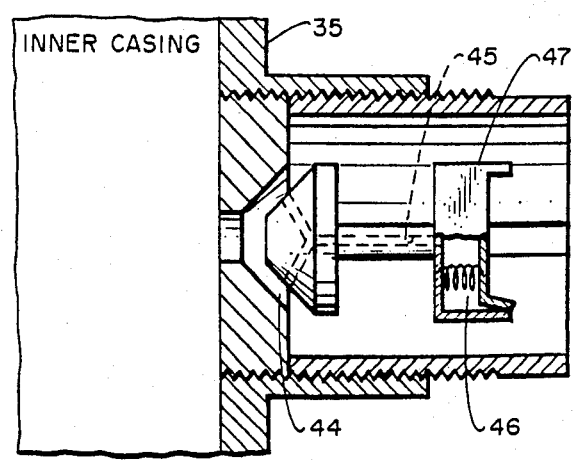

FIGS. 7, 8 and 9 illustrate the features of three types of well casing valves that can be used to start up the flow of geothermal wells and continuously maintain the flow with fluid stimulation. FIG. 7 illustrates a thermally activated primary fluid valve. To the inner casing (35) a half-coupling (36) is secured. The entire thermal valve mechanism (37) is inserted through the half-coupling (36); the valve mechanism is equipped with temperature-sensitive operating bellows (38) that can be immersed either inside the outer casing of the geothermal well (as shown) or advantageously in the inner casing of the geothermal well. The bellows (38) can be designed to either open at high temperatures or close at high temperatures, as the case may be. The bellows activates the valve (39) which fits against the valve seat (40). To prevent backflow of brine into the outer casing, a check valve (41) is added to the valve (37). The check valve can be designed as a spring-loaded unit so that a certain pressure differential between the inner and outer casings is necessary to activate it.

FIG. 8 depicts a float valve which is similar to the thermal valve described in FIG. 7, except that instead of being thermally actuated, this valve opens and closes with the level of the liquid in the outer casing. The float valve (37) is inserted into the inner casing together with a valve seat (40) and the valve (39). A lever mechanism (43) connects the valve to a float (42) where the lever is designed to either open the valve or close the valve as the float moves up or down. A check valve and other features described in FIG. 7 can be added to FIG. 8 to implement some of the activities of this type of valve.

FIG. 9 depicts a diaphragm-type valve where a balance between the flow of fluid across the face of the valve and a preset actuator are balanced internally. The diaphragm valve is designed to self-regulate the flow of fluid through the valve by balancing the Venturi effect created at the seat of the valve with a preset condition in a diaphragm or cylinder in the back of the valve. When vapor is introduced at the face of the valve at high velocity, a Venturi effect creates a low-pressure region at that place. This low pressure is transmitted through an internal cavity (45) to the actuator (46), which then opens or closes the valve in such a manner as required to control the flow. The actuator shown is a cylinder type (47). However, a diaphragm or other actuator type can be used as well. When liquid passes across the face of the valve, the velocity of the liquid is lower than that of the gas and therefore, the low-pressure zone liquid creates is lower than that which gas creates. By this mechanism, this valve can control the flow of gases and liquids in the system. Other features of this valve are similar to the valves described above.

Obviously, many modifications and variations of the present invention are possible in light of the above teachings. It is therefore to be understood that the full scope of the invention is not limited to the details disclosed herein but may be practiced otherwise than as specifically described.

What is claimed is:

1. A process causing a geothermal well to flow, comprising: injecting a primary fluid into a geothermal well; controlling the level of injection and the rate of injection of primary fluid by a plurality of control valves in a casing of the geothermal well; flowing the geothermal fluid mixture from said well and utilizing the heat of the flowed mixture; and operating the mechanism of said valves by balancing the effect of the velocity of the fluid at the face of the valve to control the rate of fluid flow through the valve.

2. The process in accordance with claim 1 wherein the heated primary fluid is in a vaporized form.

3. The process of claim 2 of controlling the flow of primary fluid in a well casing according to claim 2 including balancing the pressure differences between a valve actuator and the face of a valve; said pressure differences activating a valve mechanism to control the flow of primary fluids in the well casing.

4. A method according to claim 3 comprising flowing said primary fluid through velocity sensitive restriction valves sensitive to fluid velocity to control the flow of said primary fluid.

5. The process according to claim 4 wherein said restriction valves allow only the flow of vapor.

6. The process according to claim 5 wherein the step of injecting a primary fluid comprises injecting a vaporized hydrocarbon.

7. The process according to claim 6, including; forming said geothermal well casing with an inner and outer casing and positioning said valves at preselected levels in said inner casing.

8. The process according to claim 1 including positioning said restriction valves at selected levels in said casing to control the flow of said primary fluid.

9. The process according to claim 7, comprising the steps of: utilizing the gravitational forces of said primary fluid in the well casing to improve the heat utilization efficiency of said flowed mixture.

10. The process in accordance with claim 5, including the steps of:
separating the vapor portion from the liquid portion at the outlet of the geothermal well;
expanding the vapor portion in a power extraction gas expansion device.

11. The process in accordance with claim 10, including the steps of:
condensing said expanded vapor portion;
pumping a portion of the condensed vapor portion through heat exchange means to form vapor;
injecting the vapor formed in the heat exchanger into the geothermal well.

12. The process in accordance with claim 9, including the steps of:
condensing the vapor in a condenser at the outlet of the expander;
preheating the condensate with exhausted geothermal brine before the condensate is vaporized for reinjection.

* * * * *